United States Patent
Fu et al.

(10) Patent No.: US 11,070,060 B2
(45) Date of Patent: Jul. 20, 2021

(54) PREDICTIVE GRID CONTROL SYSTEM AND METHOD BASED ON SENSITIVITY OF VARIANCE WITH RESPECT TO ELECTRIC POWER PREDICTION

(71) Applicant: Eaton Intelligent Power Limited, Dublin (IE)

(72) Inventors: Qiang Fu, Whitefish Bay, WI (US); Sercan Teleke, Durate, CA (US)

(73) Assignee: Eaton Intelligent Power Limited

( * ) Notice: Subject to any disclaimer, the term of this patent is extended or adjusted under 35 U.S.C. 154(b) by 0 days.

(21) Appl. No.: 15/958,065

(22) Filed: Apr. 20, 2018

(65) Prior Publication Data

US 2019/0326755 A1 Oct. 24, 2019

(51) Int. Cl.
*H02J 3/18* (2006.01)
*H02J 3/38* (2006.01)
*G05B 13/04* (2006.01)
*H02J 3/00* (2006.01)

(52) U.S. Cl.
CPC ............ *H02J 3/381* (2013.01); *G05B 13/048* (2013.01); *H02J 3/18* (2013.01); *H02J 3/003* (2020.01); *H02J 2203/20* (2020.01)

(58) Field of Classification Search
None
See application file for complete search history.

(56) References Cited

U.S. PATENT DOCUMENTS

| | | | |
|---|---|---|---|
| 7,116,010 B2 | 10/2006 | Lasseter et al. | |
| 7,660,649 B1 * | 2/2010 | Hope | G06Q 10/04 700/28 |
| 8,364,609 B2 | 1/2013 | Ozog | |
| 8,682,495 B2 | 3/2014 | Carralero et al. | |
| 8,731,729 B2 | 5/2014 | Blevins | |
| 2011/0082597 A1 | 4/2011 | Meagher | |
| 2012/0022707 A1 * | 1/2012 | Budhraja | H02J 13/00002 700/292 |
| 2012/0191439 A1 | 7/2012 | Meagher et al. | |
| 2014/0288725 A1 * | 9/2014 | Itaya | H02J 3/00 700/298 |
| 2014/0316604 A1 * | 10/2014 | Ortjohann | H02J 3/381 700/298 |

(Continued)

OTHER PUBLICATIONS

Cioaca et al. 'Adjoint Sensitivity Analysis for Numerical Weather Prediction: Applications to Power Grid Optimization' Proceedings of the first international workshop on High performance computing, networking and analytics for the power grid pp. 35-42, Seattle, Washington, USA, Nov. 13, 2011, ACM New York.*

(Continued)

*Primary Examiner* — Bernard G Lindsay
(74) *Attorney, Agent, or Firm* — Stanek Lemon Crouse & Meeks, P.A.

(57) ABSTRACT

A prediction of an electric power consumption and/or a generation of at least one of a load and a source coupled to an electric power grid is generated responsive to a forecast of an event. A desired state of an asset on the grid is identified responsive to the prediction. A functional representation of a control scheme for the asset is identified based on a sensitivity of the control parameter to a variance in operation of the electric power grid with respect to the prediction.

7 Claims, 6 Drawing Sheets

(56) References Cited

U.S. PATENT DOCUMENTS

| 2016/0087566 A1* | 3/2016 | Sun | G06F 17/10 |
| | | | 700/287 |
| 2018/0048154 A1* | 2/2018 | Guo | G06N 7/005 |
| 2018/0233922 A1* | 8/2018 | Sun | H02J 3/46 |

OTHER PUBLICATIONS

Bayhan et al., "Model Predictive Droop Control of Distributed Generation Inverters in Islanded AC Microgrid," IEEE, 2016, pp. 247-252.

Bollman, Andrew Mark, Thesis, "An Experimental Study of Frequency Droop Control in a Low-Inertia Microgrid," University of Illinois at Urbana-Champaign, 2009, 60 pages.

Hou et al, "Conventional P-ω/Q-V Droop Control in Highly Resistive Line of Low-Voltage Converter-Based AC Microgrid," Energies, 9, 943, 2016, 19 pages.

Kaviri et al., "A Hybrid Adaptive Droop Control Technique with Embedded DC-bus Voltage Regulation for Single-Phase Microgrids," IEEE, 2017, pp. 3359-3366.

Shuai et al, "Droop control method for load share and voltage regulation in high-voltage microgrids," J. Mod. Power Syst. Clean Energy, 4 (1), 2016, pp. 76-86.

Yanghong et al., "Control Strategy for Plug-and-play of DGs in a Microgrid," Proceedings of the 36th Chinese Control Conference, Dalian, China, Jul. 26-28, 2017, pp. 10534-10539.

\* cited by examiner

PREDICTIVE GRID CONTROL SYSTEM AND METHOD BASED ON SENSITIVITY OF VARIANCE WITH RESPECT TO ELECTRIC POWER PREDICTION

BACKGROUND

The inventive subject matter relates to electric power distribution systems and methods and, more particularly, to systems and methods for controlling assets in electric power distribution systems.

A microgrid is a group of interconnected loads and distributed energy resources that can act as a single controllable entity with respect to the grid. A typical microgrid can be connected to and disconnected from a larger (e.g., utility) grid, such that the microgrid can operate in both a grid-connected and an islanded mode. A microgrid may include multiple distributed energy resources (DERs), such as diesel or natural gas fired generators, and storage devices, such as batteries, capacitor banks and flywheel storage devices, distributed over a geographic region and interconnected by distribution lines with a relatively low reactance/resistance (X/R) ratio. Generators coupled to such a grid may be controlled using, for example, advanced droop control techniques, such as adaptive droop control or virtual droop control, to improve stability and reliability. Such approaches may, however, sacrifice performance and may fail to address certain stability and reliability issues associated with higher penetration of intermittently available renewable sources. Conventional solutions to such issues include oversizing dispatchable resources to deal with power fluctuations associated with such renewable resources, which can be undesirable in terms of energy efficiency and atmospheric emissions.

SUMMARY OF THE INVENTION

Some embodiments of the inventive subject matter provide methods, apparatus and computer program products for operating an electrical power grid, such as a microgrid. A prediction of an electric power consumption and/or a generation of at least one of a load and a source coupled to an electric power grid is generated responsive to a forecast of an event. A desired state of an asset on the grid is identified responsive to the prediction. A functional representation of a control scheme for the asset is identified based on a sensitivity of the control parameter to a variance in operation of the electric power grid with respect to the prediction.

According to some embodiments, the functional representation includes a first function that relates real power to a voltage frequency and a voltage magnitude and a second function that relates reactive power to the voltage frequency and the voltage magnitude. The functional representation may be identified by generating a set of coefficients for the first and second functions.

According to further embodiments, the asset may be controlled responsive to the functional relationship. For example, the asset may be controlled by operating a droop control scheme that uses the functional relationship.

According to some aspects, determining a desired state of an asset may include identifying a set point for a controller of the asset and identifying a functional relationship may include performing a sensitivity analysis on the set point.

Still further embodiments provide a system including a source/load predictor configured to generate a prediction of an electric power consumption and/or a generation of at least one of a load and a source coupled to an electric power grid responsive to a forecast of an event, a power flow determiner configured to determine a desired state an asset on the grid responsive to the prediction, and a sensitivity determiner configured to identify a functional representation of a control scheme for the asset based on a sensitivity of the control parameter to a variance in operation of the electric power grid with respect to the prediction.

Additional embodiments provide methods, apparatus and computer program product for controlling an asset on an electric power grid. A set point for a control parameter of the asset is determined from a function that reflects a sensitivity of the control parameter to a variance in operation of the electric power grid with respect to a prediction of operation of the electric power grid, and the asset is controlled responsive to the determined set point.

DETAILED DESCRIPTION

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like items. It will be understood that when an item is referred to as being "connected" or "coupled" to another item, it can be directly connected or coupled to the other item or intervening items may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, items, and/or components, but do not preclude the presence or addition of one or more other features, integers, steps, operations, items, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

Some embodiments of the inventive subject matter arise from a realization that microgrids typically exhibit relatively low X/R ratio interconnections, and that conventional droop control techniques fail to take into account low X/R line infrastructure that leads to highly coupled real power and reactive power interaction. Some embodiments provide improved systems and methods for control of an electrical power grid in which a three-dimensional droop control technique is dynamically updated using a grid model and forecast information, enabling compensation for coupling effects between real and reactive power.

Figure 1:
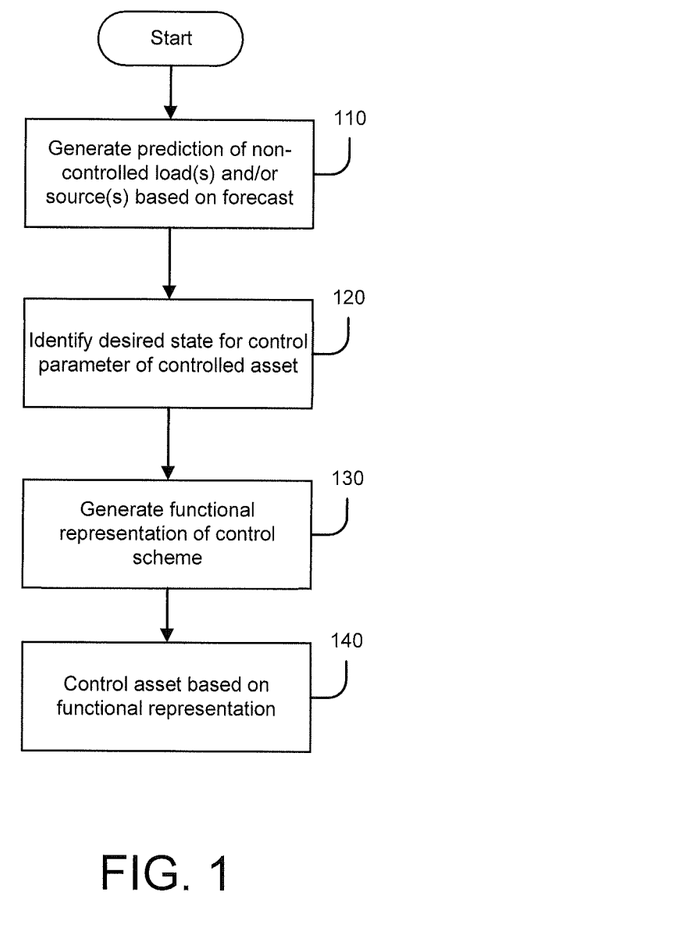
FIG. 1 is a flowchart illustrating operations of a control system for an electrical power grid according to some embodiments of the inventive subject matter.

FIG. 1 illustrates exemplary operations of a control system using such a control scheme according to some embodiments of the inventive subject matter. A prediction of load(s) and/or source(s) for assets on the grid not controlled by the system is generated based on a forecast (block 110). The forecast may include, for example, a forecast of weather, human activity and/or other events that could impact loads and/or sources on the grid. For example, the forecast may include a forecast of solar insolation for an area in which a photovoltaic system coupled to the grid is located, and a prediction produced based on this forecast may include a prediction of an electric power output of a grid-tied inverter of the photovoltaic system. In another example, the forecast may be a forecast of an occupancy and/or environmental factors (e.g., outside temperature) affecting a building connected to the grid, and a prediction generated from this forecast may include a prediction of an electric power load presented by the building.

Based on the generated prediction, the control system may identify a desired state for a control parameter of a controlled asset on the grid (block 120). As used herein, a "controlled asset" may include, for example, a dispatchable energy source, such as a diesel or natural gas-fired generator, an electrical storage device, such as a battery bank, flywheel storage device or the like, and/or a controlled load, such as a load (e.g., a heating, ventilation and air conditioning (HVAC) load) that can be selectively energized or de-energized to increase or reduce power demand. The control parameter may include, for example, a real power, a reactive power, a voltage magnitude and/or a voltage frequency. Responsive to the identification of the desired state for the controlled asset, the control system may generate a functional representation of a control scheme for the asset based on a sensitivity of the control parameter to a variance in operation of the electric power grid with respect to the prediction (blocks 130, 140).

Some embodiments can provide a new optimal control strategy with three-layer control architecture including a system controller that is responsible for system level analysis, and that can also perform more sophisticated studies, such as optimal power dispatch, based on forecasted information. The system controller can take the predicted cases and determine optimal set points for controlled assets (generators, regulators, capacitor banks, storage devices, etc.) for a predictable time horizon (e.g., two hours). A model predictive controller can take these optimal set points and determine the most optimal parameters by considering DER constraints and availabilities (e.g., state of charge (SOC) of a battery, ramp-rate, etc.) in the next control time horizon. A sensitivity analysis can provide the impact of changes in real or reactive power to each connected DER in the form of control coefficients for a three-dimensional droop control scheme that is used in a local control layer. This three-dimensional droop control can compensate for the coupling effect between real and reactive power which is common in some low inertia and low (X/R) ratio systems, such as microgrids. The real and reactive power or voltage and frequency commands for DERs may be derived from the droop curves defined by the coefficients determined by system controller. With an accurate forecast, the system may run optimally as the droop curves for DERs are adjusted accordingly, which the added potential benefit being that an inaccurate forecast may not cause instability, as the DERs are managed by a droop control scheme that balances the load and source.

Figure 2:
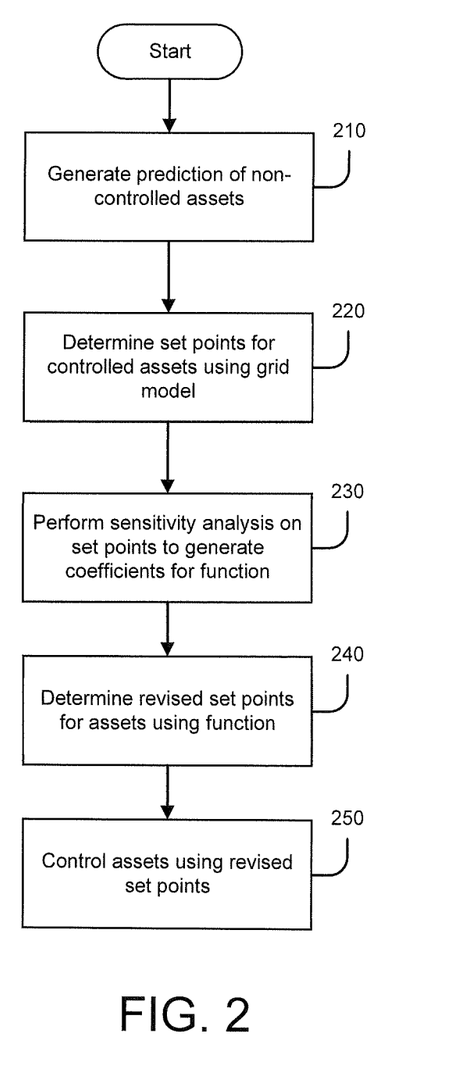
FIG. 2 is a flowchart illustrating operations of a control system of an electrical power grid according to further embodiments.
Figure 3:
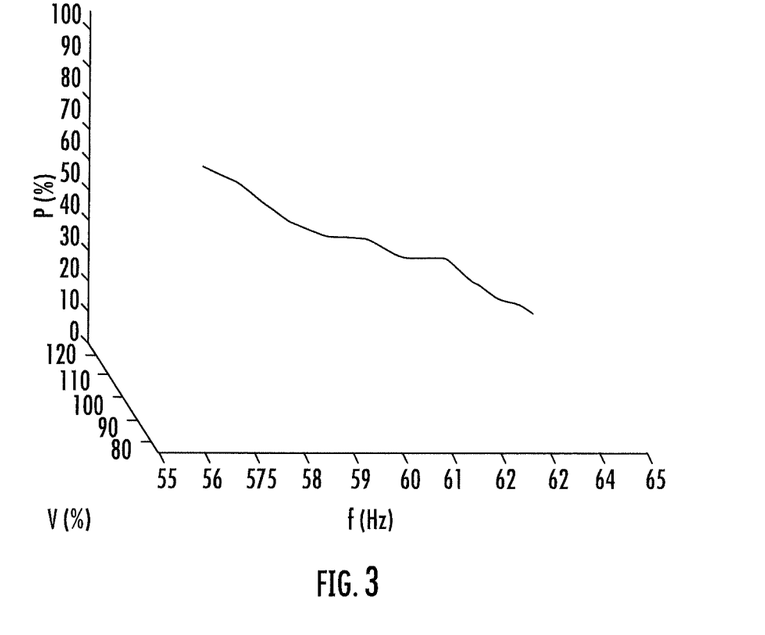
FIGS. 3 and 4 are charts illustrating examples of three-dimensional droop control functions according to further embodiments.
Figure 4:
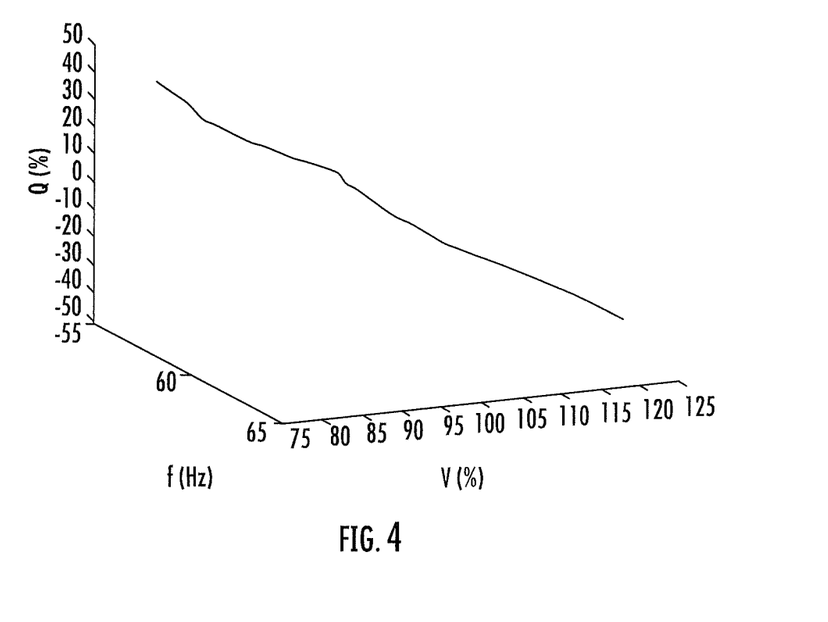

FIG. 2 illustrates operations of a control system according to further embodiments. The system generates a prediction of non-controlled sources and/or loads on the grid based on a forecast (block 210). Responsive to this prediction, the system generates set points for controlled assets on the grid using a model of the grid (block 220). The set points may be generated, for example, by an optimal load flow analysis performed on a model of the grid given the prediction of sources and/or loads. The system then performs a sensitivity analysis on the set points to generate coefficients for control functions that are used to control the controllable assets (block 230). According to some embodiments, the coefficients may be coefficients of control functions that reflect an interdependence of control parameters such as real power, reactive power, voltage magnitude and voltage frequency. For example, the functions may be real power P and reactive power Q functions as defined below:

$$P(t)=P0-kPF(t)*(f(t)-f0)-kPV(t)*(V(t)-V0) \qquad (1); \text{ and}$$

$$Q(t)=Q0-kQF(t)*(f(t)-f0)-kQV(t)*(V(t)-V0) \qquad (2),$$

where t is time, V(t) is the grid voltage at the asset, f(t) is the voltage frequency, kPF, kPV, kQF, and kQV are the coefficients, and V0, f(0), P0 and Q0 are initial conditions. FIGS. 3 and 4 illustrate examples of three-dimensional curves corresponding to Eq. (1) and (2). These functions may be viewed as implementing a three-dimensional droop control, in contrast to conventional droop control techniques. Referring again to FIG. 2, the system may generate revised set points for the controllable assets using the control functions as defined by the coefficients (block 240), and these revised set points may be used to control the assets (block 250).

Figure 5:
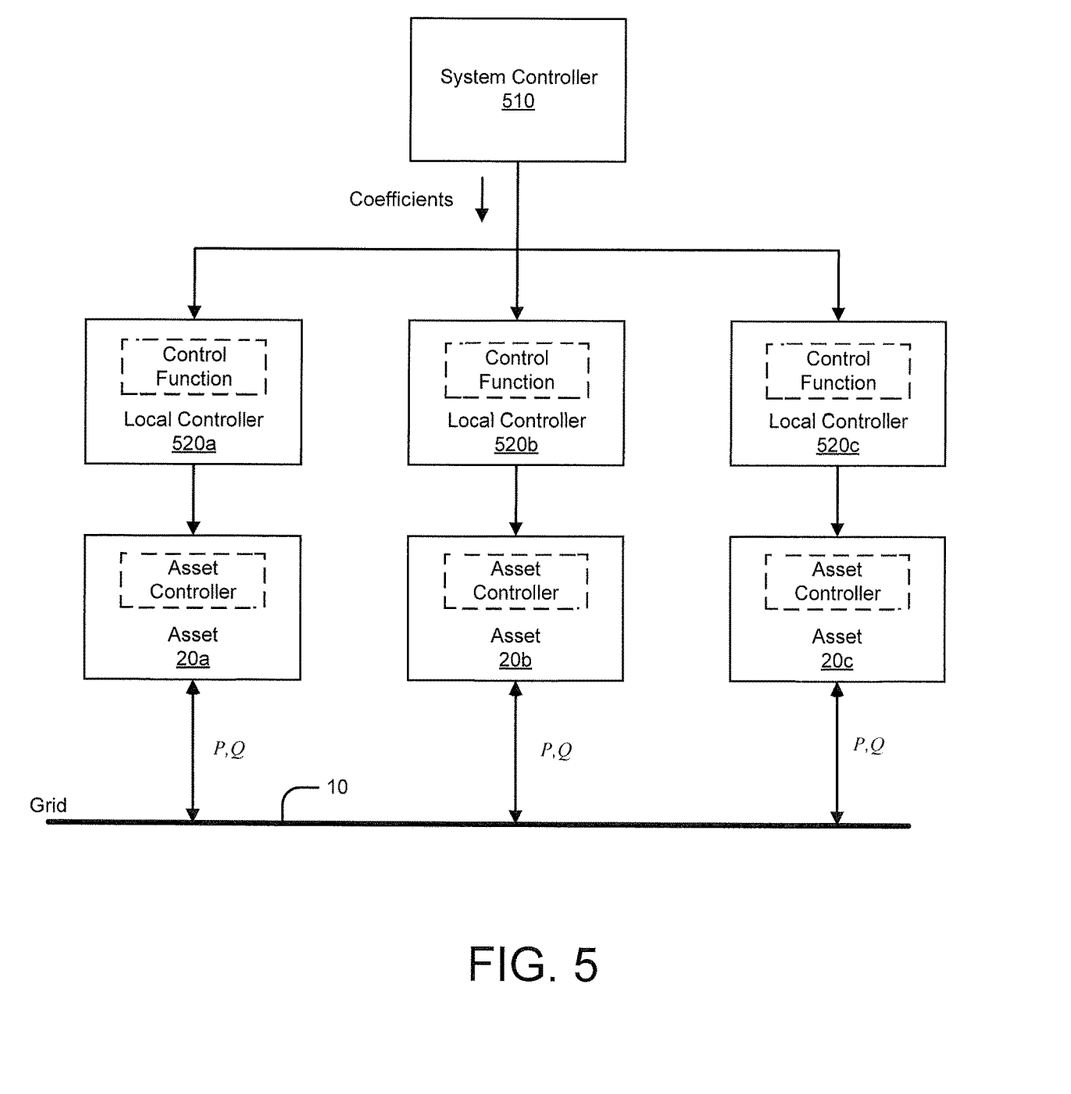
FIG. 5 is a block diagram illustrating a control system for an electrical power grid according to some embodiments.

FIG. 5 illustrates a control system architecture that may be used to implement a grid control scheme along the lines described above with reference to FIG. 2. Multiple controlled assets 20a, 20b, 20c are coupled to an electrical power grid 10. The assets 20a, 20b, 20c may include, for example, diesel or gas-fired generators, energy storage devices (e.g., batteries, capacitor banks, etc.) and/or loads, each of which is capable of producing and/or consuming real power P and/or reactive power Q. Respective local controllers 520a, 520b, 520c are configured to control respective ones of the assets 20a, 20b, 20c. For example, the local controllers 520a, 520b, 520c may each be configured to implement a three-dimensional droop control scheme like the one described with reference to FIGS. 2-4 responsive to control coefficients received from a system controller 510, which may implement the prediction, load flow and sensitivity analysis operations described above with reference to FIGS. 1 and 2.

According to the control architecture described above, the microgrid system controller 510 can be a dual redundant controller with hot-standby functionality such that a standby controller automatically takes over active control of the microgrid in case of primary controller failure. The system controller 510 can interface with upstream supervisory control and data acquisition (SCADA) system and optimize and coordinate the operation of controlled assets (sources and loads) through the downstream local controllers 520a, 520b, 520c. The system controller 510 can also support various system-wide applications, such as optimal source dispatching or demand control, and applications for specific sources such as renewable firming, etc. The processes executed by the system controller 510 may be adaptable to the status of the downstream local controllers 520a, 52b, 520c and associated devices, e.g., may modify set points and sequencing to compensate for devices which are offline, underperforming, or under local control. The system controller 510 can also provide remote access to the control system via a secure communication network. The system controller 510 can also have the capability to interface with external devices such as meters and protective relays for monitoring and control. An example of a device that may be programmed to implement the above-described system controller functionality is the Eaton SMPTM SG-4250 Gateway, described at cooperindustries.com/content/public/en/power_systems/products/automation_and_control/smp_products/smp-sg-4250.html.

The local controllers 520a, 520b, 520c, can provide semi-autonomous, fast device control, maintain operation within connected equipment limits and provide local sequencing and alarm management, and can further include an integrated sequence of events recorder. The local controllers 520a, 520b, 520c can scale, normalize and manage control, operational and monitoring data flow to the upstream system controller 510. The controlled assets 20a, 20b, 20c can be inverter based, such as solar PV system or energy storage, and/or can be generators, such as reciprocating engine generator sets. The assets 20a, 20b, 20c, may include controllers capable of communication with the local controllers 520a, 520b, 520c. An example of a device that may be programmed to implement to the above-described local controller functionality is the Eaton SMP 4/DP Distribution Processor, described at cooperindustries.com/content/public/en/power_systems/products/automation_and_control/smp_products/smp-4-dp-gateway.html.

In the system controller 510, model predictive control can take forecasted load and source information and generate set points by considering asset dynamics within the microgrid. The outputs can be imported to an optimal load flow analysis to search for an ideal configuration, such as a generator voltage/frequency or a real/reactive power output of a photovoltaic system. Conventional control methods may let DERs run autonomously without performing optimal study or may pass configuration directly to the microgrid assets and rely on slack bus (e.g., a utility or other strong resource) to absorb damping caused by the forecast error, which can make the system costly and less robust. In contrast, some embodiments of the inventive subject matter can take an optimal microgrid configuration and turn it into a set of coefficients by running sensitivity analysis with microgrid line infrastructures. These coefficients can provide much slower dynamics.

In the local controllers 520a, 520b, 520c, the 3-dimensional droop control can take the coefficients with constraints considered and adjust the assets 20a, 20b, 20c toward the optimal set points. Because of this arrangement, the forecast may only significantly impact the level of optimization and may not significantly influence the stability of the microgrid. Communication latency may have negligible impact on the microgrid robustness as well, because the assets 20a, 20b, 20c are generally running in a droop mode where stability generally does not rely on communication.

Figure 6:
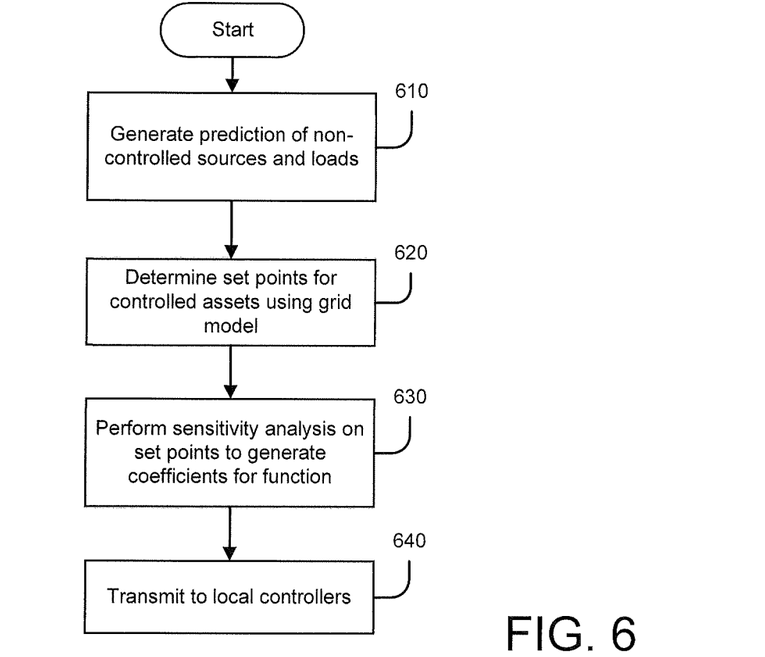
FIG. 6 is a flowchart illustrating operations of a system controller of the control system of FIG. 5 according to some embodiments.

FIG. 6 illustrates exemplary operations of the system controller 510 according to some embodiments. The system controller 510 generates a prediction of generation and/or consumption by non-controlled assets responsive to a forecast (block 610). Based on this prediction, the system controller 510 performs a load flow analysis to generate set points for the controlled assets 20a, 20b, 20c (block 620). The set points may be for, example, desired real and reactive power flows for the controlled assets 20a, 20b, 20c. The system controller 510 performs a sensitivity analysis for these set points to generate coefficients for functions that may be used to control the assets 20a, 20b, 20c (block 630). The coefficients may, for example, be coefficients of functions that relate real power P to voltage amplitude and frequency and reactive power Q to voltage amplitude and frequency, such as the functions of Equations (1) and (2) discussed above. The coefficients may be transmitted to the local controllers 520a, 520b, 520c (block 640).

Figure 7:
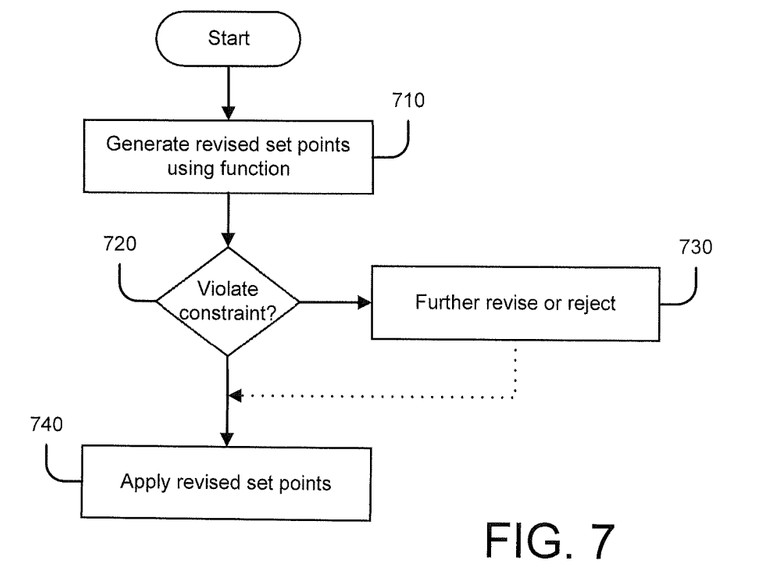
FIG. 7 is a flowchart illustrating operations of a local controller of the control system of FIG. 5 according to some embodiments.

Referring to FIG. 7, at the local controllers 520a, 520b, 520c, the functions in Equations (1) and (2) may be used to generate revised set points for controlling the assets 20a, 20b, 20c (block 710). The local controllers 520a, 520b, 520c may determine whether the revised set points violate any local constraints and, if not, may apply the revised set points in controlling the assets 20a, 20b, 20c (blocks 720, 730). If one or more constraints is violated, the local controllers 520a, 520b, 520c may reject the new set points (e.g., return to the system controller 510 with an error message) and/or may generate revised set points that meet the local constraints and apply them to the controlled assets 20a, 20b, 20c (blocks 720, 740, 730).

Figure 8:
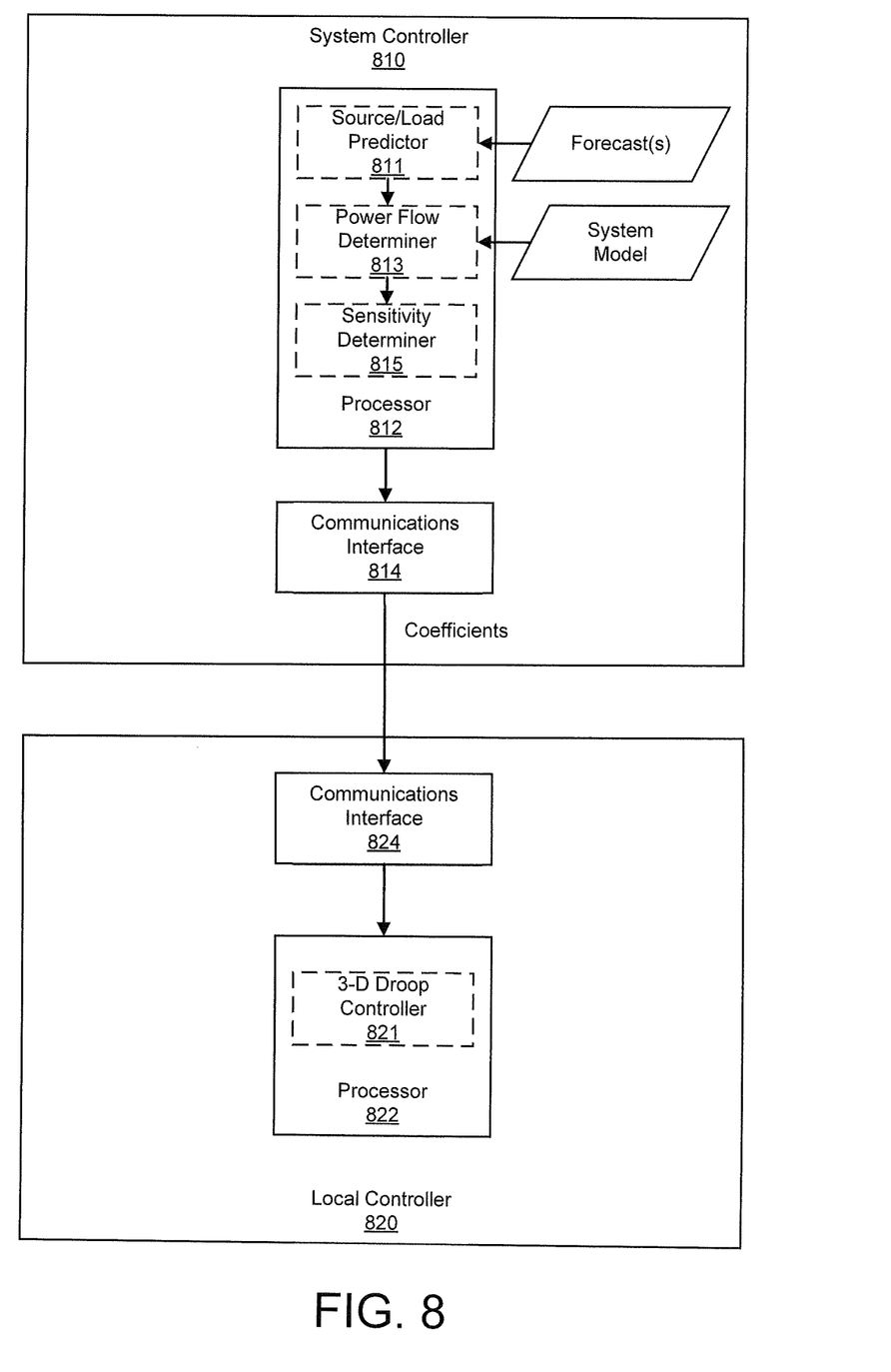
FIG. 8 is a block diagram illustrating a configuration of a system controller and a local controller for the system of FIG. 5 according to further embodiments.

FIG. 8 illustrates an exemplary implementation of a system controller 810 and a local controller 820 according to some embodiments. The system controller 810 includes a processor 812 (e.g., one or more microprocessors or other data processing devices, along with associated memory and peripheral circuitry), which is configured to execute software to implement a source/load predictor 811, a power flow determiner 813 and a sensitivity determiner 815. The source/load predictor 811 generates a prediction of non-controlled source generation and/or load consumption responsive to one or more forecasts, as described, for example, with reference to FIG. 5. The source/load prediction is provided to the power flow determiner 813, which, using a model of the grid, identifies set points for controlled assets on the grid based on the prediction, e.g., an optimal allocation of real and reactive power generation and/or consumption among the controlled assets. The sensitivity determiner 815 performs a sensitivity analysis on these set points, producing coefficients for control functions that are to be used by the local controller 820 to control one of the controlled assets. The coefficients are communicated from the processor 812 via communications interface 814 that is coupled to a matching communications interface 824 in the local controller 820.

The local controller 820 includes a processor 822 (e.g., one or more microprocessors or other data processing devices, along with associated memory and peripheral circuitry), which is configured to execute software to implement a three-dimensional droop controller 821 and device controller. The droop controller 821 is configured to use one or more control functions characterized by the transmitted coefficients to generate revised set points for the asset to be controlled, and passes the revised set points on to a device controller (included in or separate from the local controller 820), which controls the asset to meet the revised set points. For example, the set points may include a desired real power and reactive power based on a voltage magnitude and frequency at the asset as described in Eqs. (1) and (2), and the device controller may include one or more closed loop control systems that are configured to control the asset (e.g., a generator or inverter) to provide the desired real and reactive power flows.

Some embodiments are described above with reference to block diagrams and/or flowchart illustrations of methods, devices, systems and/or computer program products. It is understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means (functionality) and/or structure for implementing the functions/acts specified in the block diagrams and/or flowchart block or blocks.

These computer program instructions may also be stored in a non-transitory computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, example embodiments may be implemented in hardware and/or in software (including firmware, resident software, micro-code, etc.). Furthermore, example embodiments may take the form of a computer program product on a non-transitory computer-usable or computer-readable medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: a random access memory (RAM), a read-only memory (ROM), an erasable programmable read-only memory (EPROM or Flash memory), a portable compact disc read-only memory (CD-ROM).

Computer program code for carrying out operations of data processing systems discussed herein may be written in a high-level programming language, such as Java, AJAX (Asynchronous JavaScript), C, and/or C++, for development convenience. In addition, computer program code for carrying out operations of example embodiments may also be written in other programming languages, such as, but not limited to, interpreted languages. Some modules or routines may be written in assembly language or even micro-code to enhance performance and/or memory usage. However, embodiments are not limited to a particular programming language. It will be further appreciated that the functionality of any or all of the program modules may also be implemented using discrete hardware components, one or more application specific integrated circuits (ASICs), or a field programmable gate array (FPGA), or a programmed digital signal processor (DSP), a programmable logic controller (PLC), or microcontroller.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated.

In the drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

That which is claimed:

1. A method for controlling assets that provide and/or consume energy on an electric power grid, the method comprising:

a system controller generating a prediction of an electric power consumption and/or a generation of at least one of a load and a source coupled to the electric power grid responsive to a forecast of an event;

the system controller determining a set point for a controller of an asset on the grid responsive to the prediction;

the system controller determining a sensitivity of the set point to a variance of the electric power consumption and/or a generation of the at least one of a load and a source with respect to the prediction of the electric power consumption and/or a generation of the at least one of a load and a source; and the system controller determining a functional representation of a control scheme for the asset based on the determined sensitivity of the set point, wherein the functional representation describes an interdependence of the set point and at least one other control parameter of the asset-, wherein the functional representation includes a first function that relates real power to a voltage frequency and a voltage magnitude and a second function that relates reactive power to the voltage frequency and the voltage magnitude;

the system controller transmitting the functional representation to a local controller associated with one of the assets; and the local controller controlling the one of the assets responsive to the functional representation.

2. The method of claim 1, wherein determining a functional representation comprises generating a set of coefficients for the first and second functions.

3. The method of claim 1, wherein controlling the asset comprises operating a droop control scheme that uses the functional representation.

4. The method of claim 1, wherein the asset comprises at least one of a power source and a load.

5. The method of claim 1, wherein the forecast comprises at least one of a weather forecast, an insolation forecast, and an activity forecast and wherein generating a prediction of an electric power consumption and/or a generation comprises generating a prediction of at least one of an electrical generator output and an electric power load from the at least one of a weather forecast, an insolation forecast, and an activity forecast.

6. A system for controlling assets that provide and/or consume energy on an electric power grid, the system comprising:
   a system controller comprising:
      a processor that implements:
         a source/load predictor configured to generate a prediction of an electric power consumption and/or a generation of at least one of a load and a source coupled to an electric power grid responsive to a forecast of an event;
         a power flow determiner configured to determine a desired state of a set point for one of the assets on the grid responsive to the prediction; and
         a sensitivity determiner configured to determine a sensitivity of the set point to a variance of the electric power consumption and/or a generation of the at least one of a load and a source with respect to the prediction of the electric power consumption and/or a generation of the at least one of a load and a source and to generate a functional representation of a control scheme for the one of the assets based on the determined sensitivity, wherein the functional representation describes an interdependence of the set point and at least one other control parameter of the one of the assets and wherein the functional representation represents a first function that relates real power to a voltage frequency and a voltage magnitude and a second function that relates reactive power to the voltage frequency and the voltage magnitude; and
      a communications interface configured to communicate with respective local controllers for respective ones of the assets and transmit the functional representation to the one of the assets; and
   a local controller associated with the one of the assets and comprising:
      a communications interface configured to receive the transmitted functional representation; and
      a processor configured to control the one of the assets using the transmitted functional representation.

7. The system of claim 6, wherein the sensitivity determiner is configured to generate a set of coefficients for the first and second functions, wherein the communications interface of the system controller is configured to transmit the coefficients to the communications interface of the local controller of the one of the assets and wherein the local controller of the one of the assets is configured to control the one of the assets responsive to the coefficients.

* * * * *